(12) United States Patent
Kim et al.

(10) Patent No.: US 11,438,927 B2
(45) Date of Patent: Sep. 6, 2022

(54) DEVICE AND METHOD FOR RESOLVING HIGH-SPEED COMPETITION AND DISTRIBUTING MULTI-CHANNELS IN CONSIDERATION OF LARGE-SCALE ACCESS BASED ON LORAWAN

(71) Applicant: Pusan National University Industry-University Cooperation Foundation, Busan (KR)

(72) Inventors: Jongdeok Kim, Busan (KR); Junhwan Huh, Busan (KR); Changhong Lee, Busan (KR); Jaemin Lee, Busan (KR); Donghyun Kim, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 26 days.

(21) Appl. No.: 17/172,822

(22) Filed: Feb. 10, 2021

(65) Prior Publication Data

US 2022/0159721 A1    May 19, 2022

(30) Foreign Application Priority Data

Nov. 16, 2020   (KR) .......................... 10-2020-0152990

(51) Int. Cl.
*H04W 74/08* (2009.01)
*H04W 74/00* (2009.01)
(Continued)

(52) U.S. Cl.
CPC ... *H04W 74/0816* (2013.01); *H04W 72/0453* (2013.01); *H04W 74/008* (2013.01); *H04W 74/0891* (2013.01); *H04W 84/18* (2013.01)

(58) Field of Classification Search
CPC ... H04W 74/08; H04W 4/80; H04W 72/0446; H04W 56/001; H04W 56/005; H04W 28/08; H04B 7/22
(Continued)

(56) References Cited

U.S. PATENT DOCUMENTS

2014/0229519 A1* 8/2014 Dietrich .............. H04L 12/4135
709/201
2019/0200390 A1* 6/2019 Kim .................... H04W 56/005
(Continued)

FOREIGN PATENT DOCUMENTS

KR   10-2000-0032728 A   6/2000
KR   10-2011-0026227 A   3/2011
(Continued)

OTHER PUBLICATIONS

Franscisco Gallego, Goodbye, Aloha!, 2016, IEEE Xplore vol. 4 (Year: 2016).*

(Continued)

*Primary Examiner* — Robert J Lopata
(74) *Attorney, Agent, or Firm* — Paratus Law Group, PLLC (57) ABSTRACT

Disclosed is a device for resolving high-speed competition and distributing multi-channels in consideration of large-scale access based on LoRaWAN that enables efficient and stable communication through limited channel resources in a large-scale wireless transmission environment through a wireless communication wide area network. The device includes a terminal node competition unit for receiving a synchronization beacon and transmitting an access request signal to a base station, and performing an aptive contention window algorithm and enabling a terminal node to enter a transmitter according to a feedback packet (FBP) competition result when the FBP is received from the base station;

(Continued)

and a terminal node transmitter for selecting a channel according to queuing rules and checking data transmission queue (DTQ) order, transmitting data when the DTQ order is a transmission turn, standing by FBP reception, and determining whether a contention resolution interval is ended to perform a DTQ reassignment process.

15 Claims, 11 Drawing Sheets

(51) Int. Cl.
 *H04W 72/04* (2009.01)
 *H04W 84/18* (2009.01)
(58) Field of Classification Search
 USPC .......................................... 370/329
 See application file for complete search history.

(56) References Cited

U.S. PATENT DOCUMENTS

2020/0204251 A1\* 6/2020 Kim ................ H04W 74/0816
2022/0104123 A1\* 3/2022 Heeger ............... H04W 56/001

FOREIGN PATENT DOCUMENTS

| KR | 10-1837684 B1 | 3/2018 |
| KR | 10-1926276 B1 | 12/2018 |
| KR | 10-1990254 B1 | 6/2019 |
| KR | 10-2019-0078748 A | 7/2019 |

OTHER PUBLICATIONS

Korean Notice of Allowance for related KR Application No. 10-2020-0152990 dated May 23, 2022 from Korean Intellectual Property Office.

\* cited by examiner

DEVICE AND METHOD FOR RESOLVING HIGH-SPEED COMPETITION AND DISTRIBUTING MULTI-CHANNELS IN CONSIDERATION OF LARGE-SCALE ACCESS BASED ON LORAWAN

ACKNOWLEDGEMENT

This research was supported by the Ministry of Science and ICT, Republic of Korea (MSIT), under a Grand Information Technology Research Center support program (IITP-2021-2016-0-00318) supervised by an Institute for Information & communications Technology Planning & Evaluation (IITP).

CROSS-REFERENCE TO RELATED APPLICATION

This application claims priority to Korean Patent Application No. 10-2020-0152990 (filed on Nov. 16, 2020), which is hereby incorporated by reference in its entirety.

BACKGROUND

The present disclosure relates to a wireless communication wide area network, and more particularly, to a device and method for resolving high-speed competition and distributing multi-channels in consideration of large-scale access based on LoRaWAN that enables efficient and stable communication through limited channel resources in a large-scale wireless transmission environment.

With the development of the Internet and the popularization of Internet of Thing (IoT) services, low-power wide-area (LPWA) that supports low power consumption design, low cost terminal supply, low construction cost, stable coverage providing, and large-scale terminal access implementation is required.

Low-power wide-area networking (LPWAN) is a type of wireless communication wide area network that supports communication with high battery efficiency and low bit rate over long distances, and is technology for realizing massive IoT.

Long Range (LoRa) is representative PHY layer technology of LPWAN and supports noise-resistant and safe wireless communication in a range of 30 km with a chirp spread spectrum (CSS) modulation technique.

LoRaWAN is an upper layer of a LoRa protocol and supports various communication classes based on an ALOHA protocol of a random access (RA) method.

Star-of-star topology of LoRaWAN is configured with network servers and multiple gateways and sensors.

When a signal transmitted by the sensor is received at one or more gateways, the signal is transmitted to a network server to improve a transmission success rate. A distributed queue RA protocol (DQRAP), first introduced by Wexin Xu, is mentioned as a promising candidate of an MAC protocol to improve the scalability of an RA protocol in a large-scale IoT environment.

A DQ is a kind of collision-free random access protocol that determines the order of data transmission after a competition process based on a collision tree algorithm (CTA). The DQ flexibly copes with unpredictable traffic patterns by operating as an RA-like protocol when traffic is low and switching to a scheduling-like protocol when traffic is high.

In the prior art, it has been demonstrated that a DQ shows a near-optimal performance in terms of channel throughput and delay regardless of the number of transmission nodes and the number of transmissions. The DQ protocol has sufficient motivation as an alternative to a MAC protocol of LPWAN.

However, the DQ was designed for a CATV and did not consider the following characteristics of wireless networks.

First, transmission of the wireless network is performed in a multi-channel environment. The DQ was designed without considering channel selection. When multiple nodes randomly select a channel and traffic is concentrated on a specific channel, the remaining channels are wasted in an idle state.

Second, a control load used for a competition process in a wireless transmission environment is enormous. In order to stably transmit wireless packets, additional transmission loads such as a preamble and a header occur. The DQ was designed without considering such a control load. The control load overhead is a major factor that degrades a DQ performance in LPWAN that considers data transmission of a small size.

A method for improving a performance by adjusting the number of data slots by applying a DQ to a media access method of LoRaWAN has been proposed, but the method cannot fundamentally reduce an absolute control overhead, resulting in serious performance degradation when transmitting small data.

Figure 1:
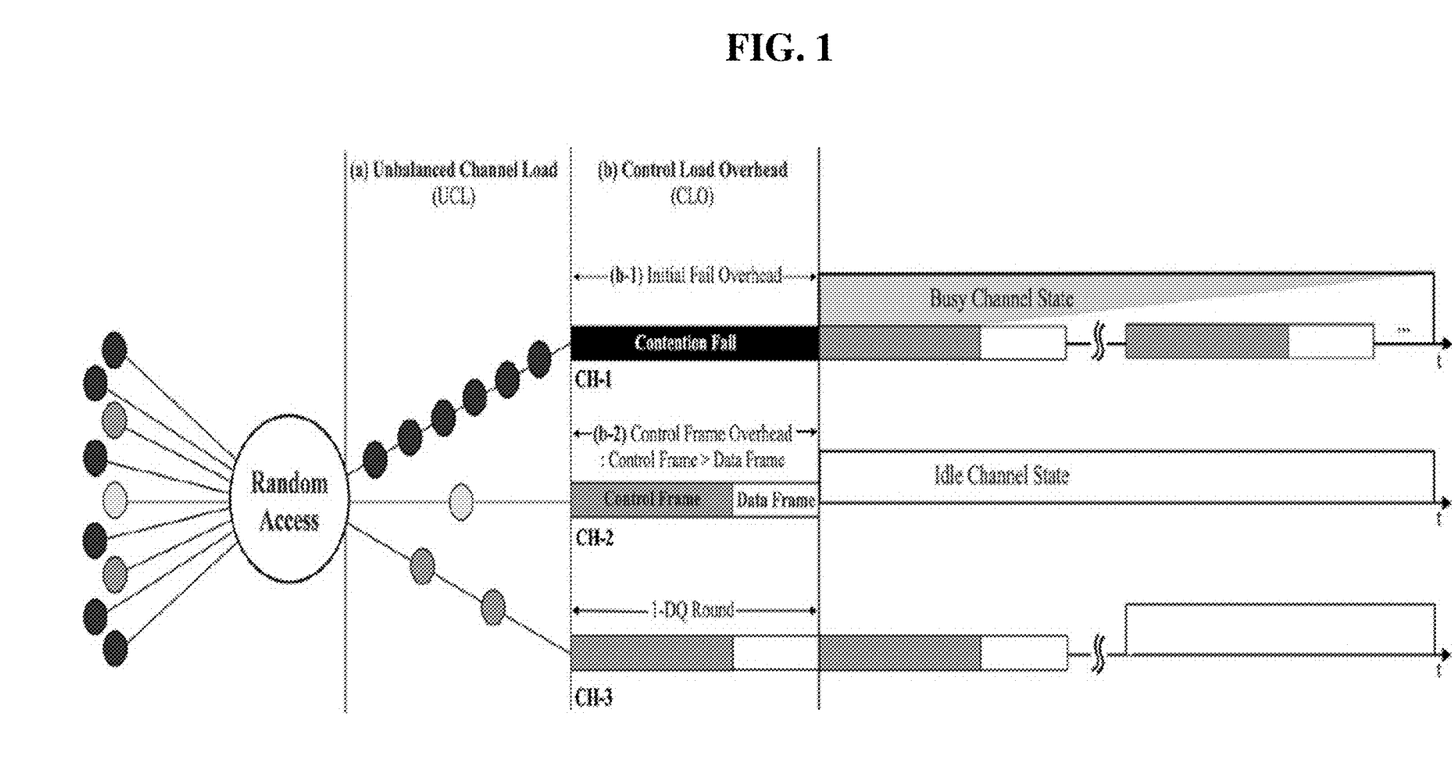
FIG. 1 is a diagram illustrating a problem that occurs when a DQ operates on a wireless network.

FIG. 1 is a diagram illustrating a problem that occurs when a DQ operates on a wireless network.

A DQ protocol was designed without considering a multi-channel access method and a control overhead of a wireless network. FIG. 1 illustrates two issues that arise when a DQ operates on a wireless network.

First, an unbalanced channel load (UCL) occurs when traffic is concentrated on a specific channel. When a specific channel becomes busy, the number of other channels in an idle state increases and thus the efficiency of the entire channel decreases. Second, a control load overhead (CLO) is an issue that occurs because a ratio of a control load (e.g., ARS, FBP) is larger than a data load when transmitting DQ frames through a wireless network.

Figure 2A:
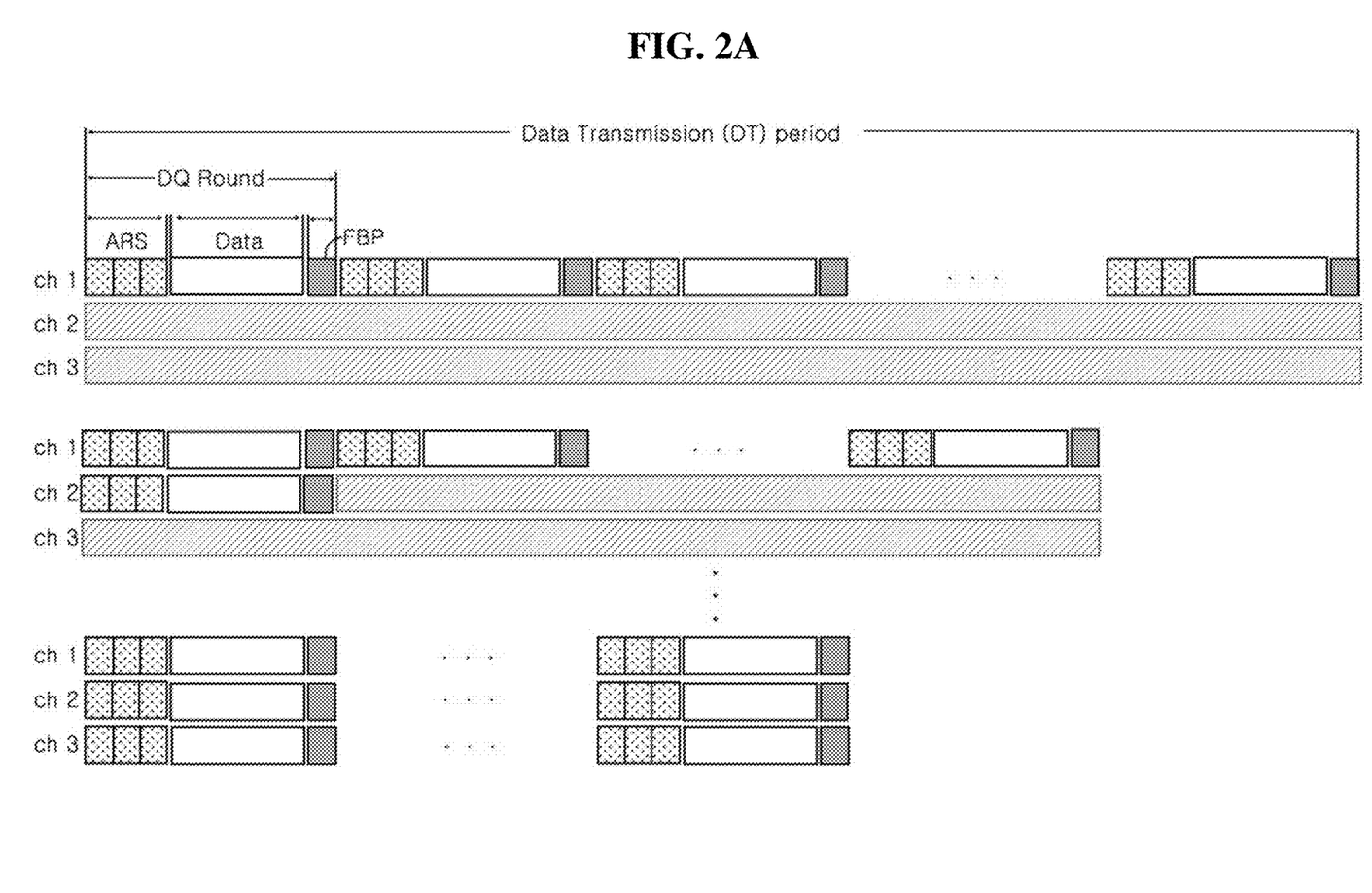
FIGS. 2A and 2B are diagrams illustrating a channel throughput imbalance problem in a wireless network using multiple channels.
Figure 2B:
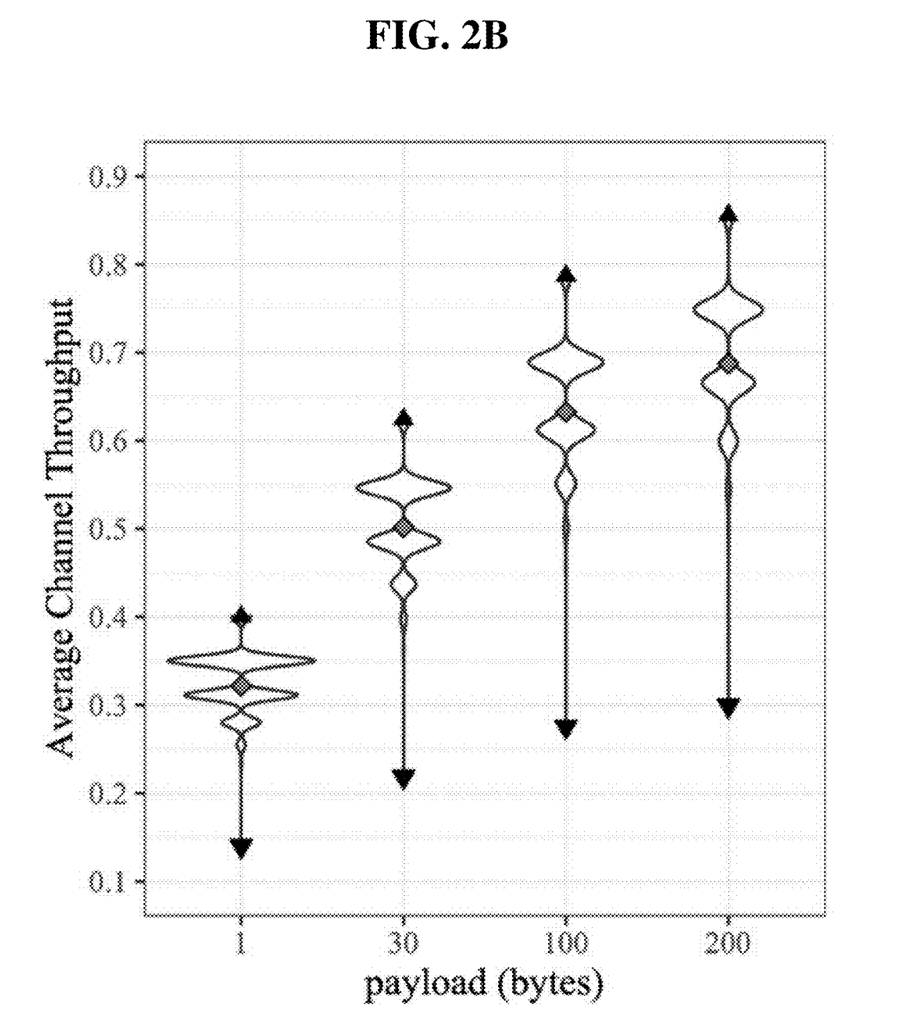

FIGS. 2A and 2B are diagrams illustrating a channel throughput imbalance problem in a wireless network using multiple channels.

Channel selection is an essential factor to be considered in a wireless network using multiple channels. The DQ protocol does not have a channel selection mechanism.

Therefore, when the DQ is used in a wireless network, random channel selection (RCS) may be considered most basically. For numerical analysis of UCL issues, when n nodes randomly select k channels, the node distribution is defined as $\alpha=(\alpha_1, \alpha_2, \ldots, \alpha_k)$.

The total number of nodes selecting a $k_{th}$ channel is denoted by $\alpha_k$, and the sum of $\alpha$ is n.

According to the above definition, after deriving $\alpha$ in all cases where n selects k, an average channel throughput of each $\alpha$ is set to $Q(\alpha)$ and an expected value of $Q(\alpha)$ in all cases is set to $\tau$.

FIG. 2B is a violin plot illustrating average channel throughput with different payloads when n=100 and k=3.

In the plot, a "violin" is configured with Q values and a width represents a frequency.

A rhombus represents $\tau$ and the result thereof represents UCL.

An average performance $\tau$ is about 20% lower than that of an upper bound case of RCS.

Table 1 represents the comparison of a length ratio of a control frame and a data frame according to a payload size.

TABLE 1

| Payload | Control Frame (%) | | | Data Frame (%) |
|---|---|---|---|---|
| (bytes) | ARS | FBP | total | |
| 1 | 10 | 49 | 59 | 41 |
| 30 | 6 | 29 | 35 | 65 |
| 100 | 3 | 15 | 18 | 82 |
| 200 | 2 | 9 | 11 | 89 |

The upper-bound of a DQ performance is determined by a length ratio of the control frame and the data frame. Because an access request signal (ARS) of the control frame does not include information, the ARS may be implemented in units of symbols. In the case of a feedback packet (FBP), the competition result and queue length information are included in the payload and transmitted.

Therefore, an overhead such as a preamble, a header, and cyclic redundancy check (CRC) is added to ensure transmission stability.

Table 1 represents the comparison of a length ratio of a control frame and a data frame according to a payload size when a DQ frame was implemented using LoRa PHY modulation.

A control frame used for transmitting 30-byte data is 35% of the entire frame. When transmitting 30 bytes of sensor data using a DQ protocol in a LoRa network, the maximum transmission efficiency is limited to 65%.

Accordingly, there is a need for development of new technology that enables efficient and stable communication through limited channel resources in a large-scale wireless transmission environment.

PRIOR ART DOCUMENT

[Patent Document]
(Patent Document 1) Korean Patent Registration No. 10-1837684
(Patent Document 2) Korean Patent Application Laid-open No. 10-2019-0078748
(Patent Document 3) Korean Patent Registration No. 10-1926276

SUMMARY

The present disclosure has been made in an effort to solve the problem of wireless communication wide area network technology of the prior art, and provides a device and method for resolving high-speed competition and distributing multi-channels in consideration of large-scale access based on LoRaWAN that enables efficient and stable communication through limited channel resources in a large-scale wireless transmission environment.

The present disclosure provides a device and method for resolving high-speed competition and distributing multi-channels in consideration of large-scale access based on LoRaWAN capable of providing a random access-based medium access control protocol that enables efficient and stable communication through limited channel resources in a large-scale wireless transmission environment.

The present disclosure provides a device and method for resolving high-speed competition and distributing multi-channels in consideration of large-scale access based on LoRaWAN that enables transmission by minimizing load balancing and wireless transmission overhead in a multi-channel wireless network environment.

The present disclosure provides a device and method for resolving high-speed competition and distributing multi-channels in consideration of large-scale access based on LoRaWAN capable of providing a transmission protocol that can utilize limited frequency resources to the maximum and maintain a high and stable performance even when transmitting a small amount of sensor data.

Other objects of the present disclosure are not limited to the above-mentioned objects, and other objects not mentioned will be clearly understood by those skilled in the art from the following description.

According to embodiments of the present disclosure, a device for resolving high-speed competition and distributing multi-channels in consideration of large-scale access based on LoRaWAN includes a terminal node competition unit for receiving a synchronization beacon and transmitting an access request signal (ARS) to a base station, and performing an aptive contention window (ACW) algorithm and enabling a terminal node to enter a transmitter according to a feedback packet (FBP) competition result when the FBP is received from the base station; and a terminal node transmitter for selecting a channel according to queuing rules and checking data transmission queue (DTQ) order, transmitting data when the DTQ order is a transmission turn, standing by FBP reception, and determining whether a contention resolution interval (CRI) is ended to perform a DTQ reassignment process.

The terminal node competition unit may include a sync beacon receiver for receiving a synchronization beacon; an ARS transmitter for transmitting an ARS to the base station; an FBP receiver for receiving a FBP from the base station; an ACW algorithm execution unit for performing an ACW algorithm; and a transmitter entry determination unit for checking the FBP competition result and enabling a terminal node to enter a transmitter, if the FBP competition result is successful, and checking the FBP competition result, and enabling a terminal node to participate in a next competition round, if the FBP competition result is unsuccessful.

The terminal node transmitter may include a channel selection unit for selecting a channel according to queuing rules; a DTQ order check unit for checking the DTQ order in a data transmission standby state; a data transmitter for checking the DTQ order and transmitting data when the DTQ order is the transmission turn; an FBP reception standby unit for standing by reception of an FBP when the channel is selected according to queuing rules; a CRI determination unit for determining whether the CRI is ended; and a DTQ redistribution unit for performing a DTQ reassignment process, if the contention resolution interval (CRI) is ended.

A selected channel model may be divided into a joint channel and a data channel, and the joint channel may be used only for competition during the CRI, and switches a role thereof to the data channel after the CRI, and the data channel may be used only for transmitting data.

All nodes may start competition in the joint channel, and perform transmission through multiple data channels in the order of nodes in which the collision is resolved, and a performance of a joint channel model in which a control part and a data part are separated may not affected by a payload size.

The ACW algorithm may adaptively increase or decrease a size of the CW according to a result of each competition round, and a $CW_{new}$, which is the CW of a next round, may be determined by the number F of total failed slots and the number E of empty slots in each slot, and be calculated as $CW_{new}=CW_{old}+F(CW_{old})-E(CW_{old})$.

The ACW algorithm may use a merged-tree structure so as to prevent the competition node from being divided into multiple descendant nodes, and in a merged-tree, conflicting nodes should participate in a next competition round, and the tree structure may generate descendant nodes in a method of merging all sub-nodes.

In the merged-tree structure, even if the CW size increases adaptively, a size of a leaf node may not drop rapidly, and the size of the window and the leaf node may decrease at the same rate.

Queuing rules for nodes successful in competition to select a data channel may include DTQ Selection Rules (during CRI) for enabling a node successful in competition to enter a shortest DTQ of the data channel when there is any failure slot; and DTQ Reallocation Rules (after CRI) in which the node moves to the DTQ of the joint channel until all lengths of the DTQ are the same according to an LI-FO policy when there is a slot without failure.

A type of the DTQ rule may be divided based on the end of the CRI, during the CRI period, the joint channel may be in a busy state because competition is in progress, and when the CRI is ended, a role of the joint channel may be switched to the data channel through DTQ redistribution, and each node may independently maintain DTQ for each channel.

During a CRI, a node whose conflict is resolved may enter a shortest DTQ in mini-slot order, and the end of the CRI may be detected when all states of a mini-slot are "empty".

During the CRI, because competition occurs in a common channel, only DTQ of the data channel may be selected, and after the CRI, a DTQ reassignment process may be performed to use the CDC channel as the data channel.

According to embodiments of the present disclosure, a method for resolving high-speed competition and distributing multi-channels in consideration of large-scale access based on LoRaWAN includes terminal node competition step of receiving a synchronization beacon, transmitting an access request signal (ARS) to a base station, and enabling a terminal node to enter a transmitter according to a feedback packet (FBP) competition result by performing an aptive contention window (ACW) algorithm when an FBP is received from the base station; and terminal node transmission step of selecting a channel according to queuing rules, checking data transmission queue (DTQ) order, transmitting data when the DTQ order is a transmission turn, standing by FBP reception, determining whether the contention resolution interval (CRI) is ended, and performing a DTQ reassignment process.

When an initial contention window (CW) is set, all nodes may simultaneously receive synchronization beacons to participate in competition, and a node successful in first round competition may selects a channel according to DTQ selection rules and enters the DTQ, and a node that enters the DTQ of each channel in a second round may transmit data according to the FI-FO (First in, First Out) policy, and nodes that fail in competition may again participate in competition.

The remaining nodes standing by in the DTQ may detect that the CRI has ended through the FBP, and the remaining nodes may move to the DTQ of the joint channel based on DTQ reassignment rules, and move to a DTQ of a last entered joint channel according to the LI-FO (Last In, First Out) policy.

All remaining collision nodes that fail in competition may participate in a next competition round and reduce the window size by 1 according to the ACW algorithm.

Advantageous Effects

As described above, a device and method for resolving high-speed competition and distributing multi-channels in consideration of large scale access based on LoRaWAN according to the present disclosure have the following effects.

First, it is possible to perform efficient and stable communication through limited channel resources in a large-scale wireless transmission environment.

Second, it is possible to provide a random access-based medium access control protocol capable of efficient and stable communication through limited channel resources in a large-scale wireless transmission environment.

Third, in a multi-channel wireless network environment, load balancing and wireless transmission overhead are minimized to enable transmission.

Fourth, it is possible to maintain high and stable performance even when transmitting a small amount of sensor data, and to provide a transmission protocol that can utilize limited frequency resources to the maximum.

DETAILED DESCRIPTION

Hereinafter, preferred embodiments of a device and method for resolving high-speed competition and distributing multi-channels in consideration of large-scale access based on LoRaWAN according to the present disclosure will be described in detail as follows.

Features and advantages of a device and method for resolving high-speed competition and distributing multi-channels in consideration of large-scale access based on LoRaWAN according to the present disclosure will become apparent through a detailed description of each embodiment below.

Figure 3:
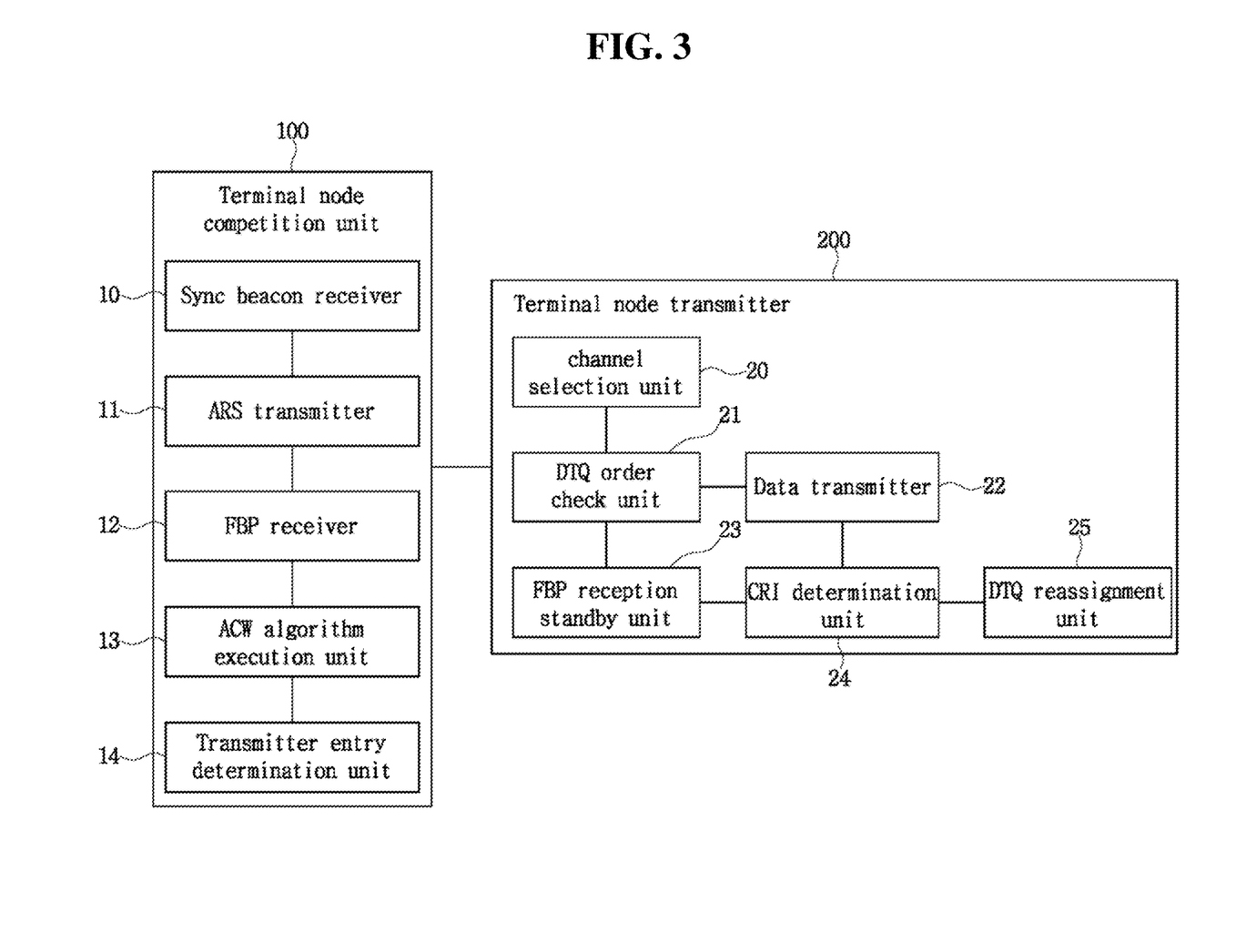
FIG. 3 is a block diagram illustrating a configuration of a device for resolving high-speed competition and distributing multi-channels in consideration of large-scale access based on LoRaWAN according to the present disclosure.

FIG. 3 is a block diagram illustrating a configuration of a device for resolving high-speed competition and distributing multi-channels in consideration of a large-scale access based on LoRaWAN according to the present disclosure.

The device and method for resolving high-speed competition and distributing multi-channels in consideration of large-scale access based on LoRaWAN according to the present disclosure provide a random access-based medium access control protocol capable of efficient and stable communication through limited channel resources in a large-scale wireless transmission environment.

To this end, the present disclosure may include a configuration that enables transmission by minimizing load balancing and wireless transmission overhead in a multi-channel wireless network environment.

The present disclosure may include a transmission configuration capable of maintaining a high and stable performance even when transmitting sensor data of a small amount (within 30 bytes) and utilizing a limited frequency resource to the maximum.

A device for resolving high-speed competition and distributing multi-channels in consideration of large-scale access based on LoRaWAN according to the present disclosure includes a terminal node competition unit 100 and a terminal node transmitter 200, as illustrated in FIG. 3.

The terminal node competition unit 100 includes a sync beacon receiver 10 for receiving a synchronization beacon, an access request signal (ARS) transmitter 11 for transmitting an ARS to a base station, a feedback packet (FBP) receiver 12 for receiving an FBP from the base station, an aptive contention window (ACW) algorithm execution unit 13 for performing an ACW algorithm, and a transmitter entry determination unit 14 for checking a FBP competition result and enabling a terminal node to enter a transmitter, if the competition result is successful and for checking an FBP competition result and enabling a terminal node to participate in a next competition round, if the competition result is not successful.

The terminal node transmitter 200 includes a channel selection unit 20 for selecting a channel according to queuing rules, a DTQ order check unit 21 for checking data transmission queue (DTQ) order in a data transmission standby state, a data transmitter 22 for checking the order of a DTQ and transmitting data when the DTQ order is a transmission turn, an FBP reception standby unit 23 for standing by reception of an FBP when a channel is selected according to queuing rules, a contention resolution interval (CRI) determination unit 24 for determining whether an CRI is ended, and a DTQ reassignment unit 25 for performing a DTQ reassignment process, if the CRI is ended.

The device for resolving high-speed competition and distributing multi-channels in consideration of large-scale access based on LoRaWAN according to the present disclosure having such a configuration may perform the following operations.

First, the device performs step in which all nodes simultaneously receive synchronization beacons to participate in competition when initial contention window (CW) setting is made; step in which nodes successful in first round competition select a channel according to DTQ selection rules and enter a DTQ; step in which a node entered a DTQ of each channel in a second round performs data transmission according to the FI-FO (First in, First Out) policy, and in which nodes that fail in competition participate again in competition; and step in which the remaining nodes repeatedly perform a process of a previous round and in which all competition processes are ended when the remaining nodes successfully compete in a next round.

The remaining nodes standing by in the DTQ detect that a CRI has ended through an FBP, and the remaining nodes move to a DTQ of a joint channel based on DTQ reassignment rules, and move to a DTQ of a last entered joint channel according to the LI-FO (Last In, First Out) policy.

Figure 4:
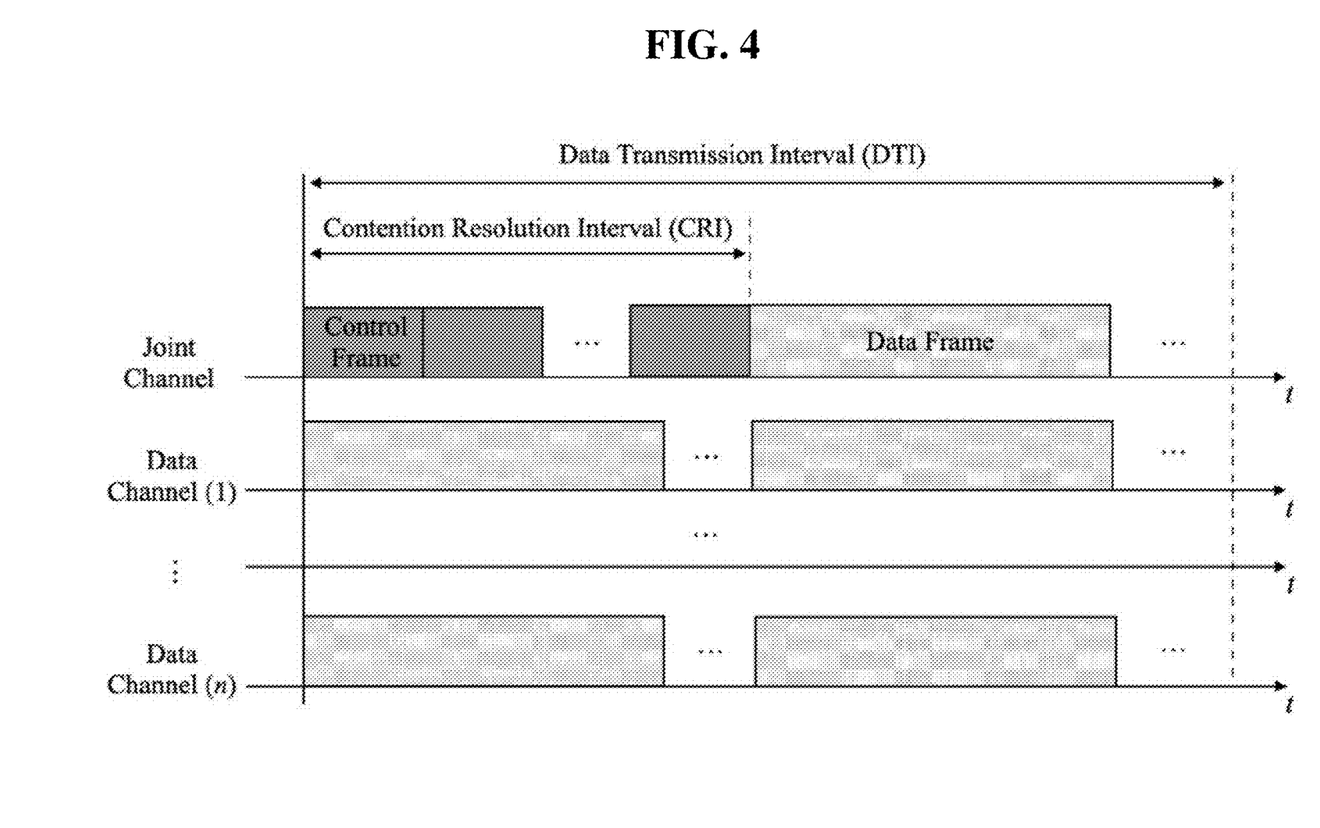
FIG. 4 is a diagram of a channel model according to the present disclosure.

FIG. 4 is a diagram of a channel model according to the present disclosure.

The channel model according to the present disclosure is divided into a joint channel and a data channel.

The joint channel is used only for competition during a CRI, and switches a role thereof to a data channel after the CRI. The data channel is used only for data transfer.

All nodes start competition in the joint channel, and perform transmission through multiple data channels in the order of nodes in which the collision is resolved.

The following benefits can be expected by using a joint channel model.

First, all channels can be used equally. However, a node successful in completion can select a data channel.

Second, a payload size does not directly affect a performance. The existing DQ has a form in which a control frame and a data frame are combined in a 1-DQ round. When all nodes fail to compete, the loss of data slots occurs.

However, a performance of a joint channel model in which a control part and a data part are separated is not affected by a payload size.

Figure 5:
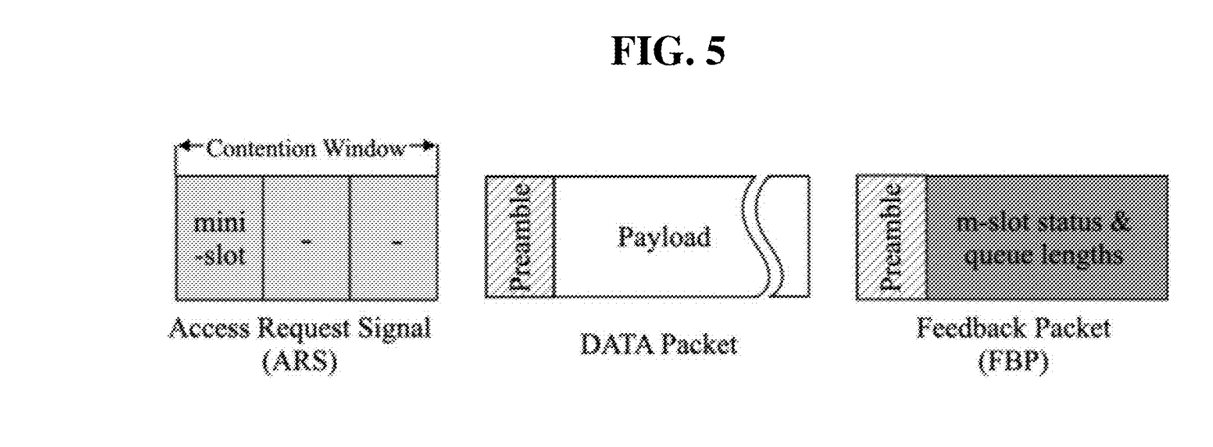
FIG. 5 is a block diagram illustrating a legacy window algorithm using a 3-size contention window.

FIG. 5 is a block diagram illustrating a legacy window algorithm using a 3-size contention window (CW).

The present disclosure includes a configuration for adaptively controlling a CW in consideration of traffic prediction uncertainty in a large-scale wireless network environment.

The concept of an adaptive CW is to increase or decrease the size of the CW according to the result of each competition round, and CWnew, which is a CW of the next round, is determined by the total number of failed slots (F) and the number of empty slots (E) in each slot, and is calculated as in Equation 1.

$$CW_{new} = CW_{old} + F(CW_{old}) - E(CW_{old}) \qquad \text{[Equation 1]}$$

Figure 6A:
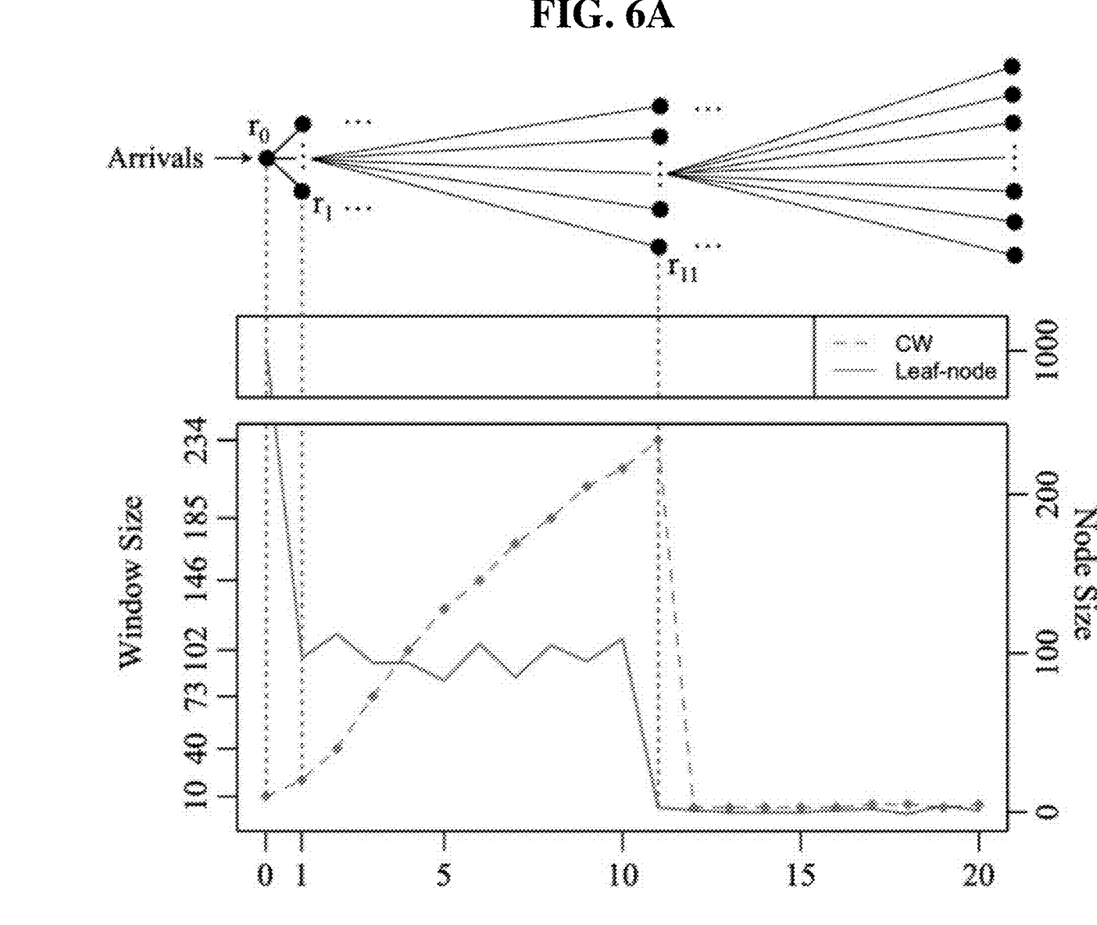
FIGS. 6A and 6B are graphs comparing characteristics of a competition resolution tree with an adaptive increase in a CW size.
Figure 6B:
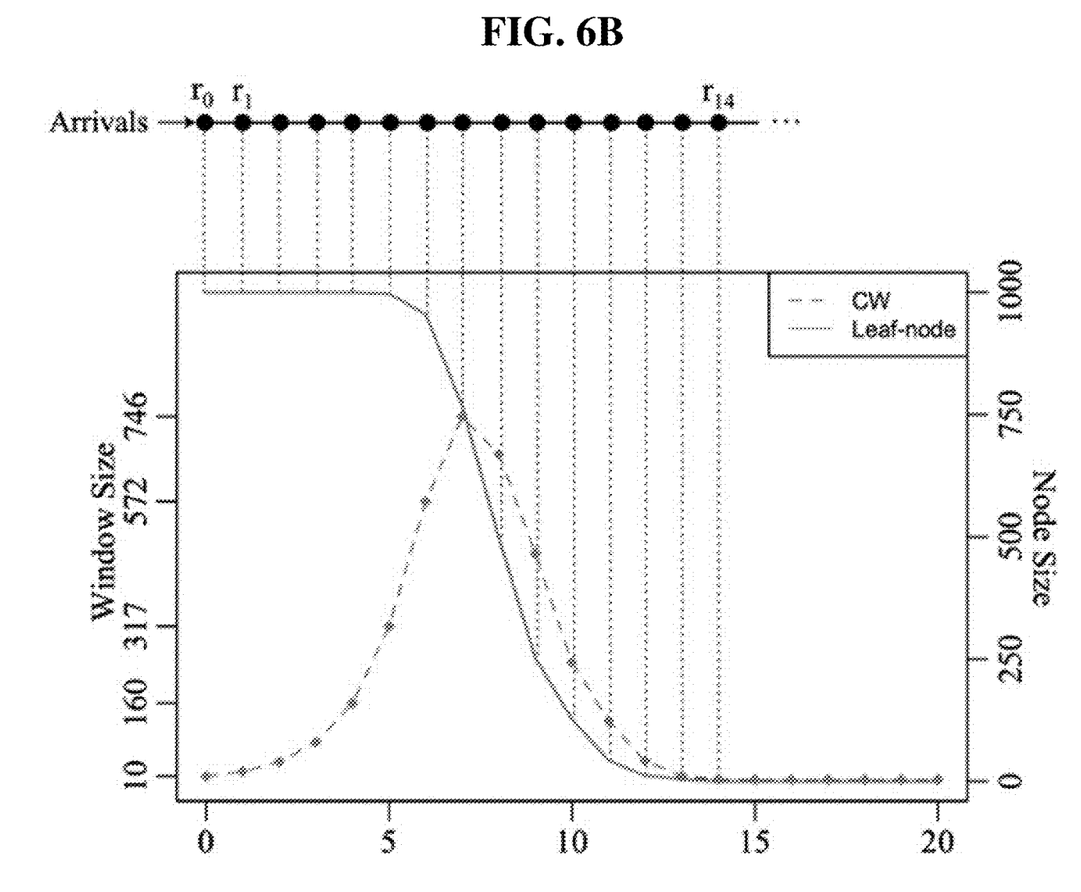

FIGS. 6A and 6B are graphs comparing characteristics of a competition resolution tree in which the CW size is adaptively increased.

When solving competition using a large window size in an m-ary competition tree, a leaf node size decreases rapidly in stages.

The reason for reduction in a leaf node size is that the m-ary tree was designed to distribute competition by generating maximum m sub-nodes per round.

The purpose of an adaptive contention window according to the present disclosure is to effectively solve a lot of competition at once in a joint channel model, but the size of each leaf node is reduced to prevent competition resolution.

Therefore, in the present disclosure, a merge-tree structure is used for preventing a competition node from being divided into multiple descendant nodes.

In a merged-tree, conflicting nodes should participate in a next competition round.

As a result, the tree structure has a final form similar to a list by generating descendant nodes in a method of merging all sub-nodes.

The remarkable difference between an m-ary tree and a merged-tree is that even if the CW size adaptively increases, the size of the leaf node does not drop sharply.

In the merged-tree, because the window size is appropriately adjusted, it can be seen that the leaf node and the window size decrease at the same rate (round 7).

The mechanism in which a node successful in competition may select a data channel is as follows.

DTQ Selection Rules (during CRI) are to ensure that a node successful in competition enters the shortest DTQ of the data channel, if there is even one failure slot.

DTQ Reallocation Rules (after CRI) are to ensure that a node moves to the DTQ of the joint channel until all lengths of the DTQ are the same according to the LI-FO policy, if there is a slot without failure.

Types of DTQ rules are divided based on the end of the CRI. During a CRI period, competition is ongoing and thus the joint channel is in a busy state. When the CRI is ended, a role of the joint channel is switched to the data channel through data transmission queue (DTQ) redistribution.

Each node independently maintains the DTQ for each channel.

During the CRI, a node whose collision is resolved enters the shortest DTQ in mini-slot order. The end of the CRI may be easily detected when a state of the mini slot is all "empty".

During the CRI, competition occurs in a common channel and thus only the DTQ of the data channel may be selected. After the CRI, to use a CDC channel as a data channel, a DTQ reassignment process is performed.

Figure 7:
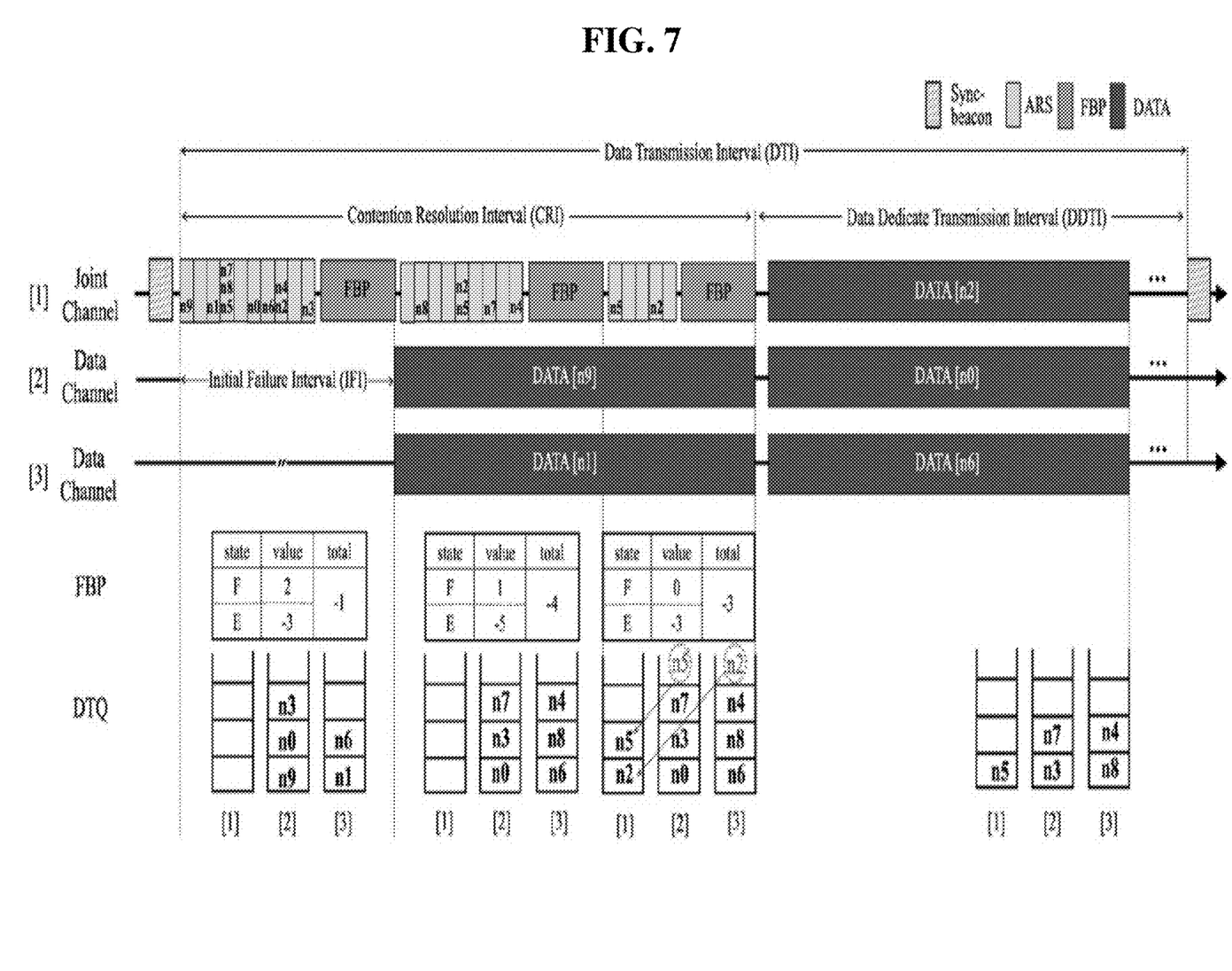
FIG. 7 is an exemplary diagram of transmission through a device for resolving high-speed competition and distributing multi-channels in consideration of large-scale access based on LoRaWAN according to the present disclosure.

FIG. 7 is an exemplary diagram of transmission through a device for resolving high-speed competition and distributing multi-channels in consideration of large-scale access based on LoRaWAN according to the present disclosure.

FIG. 7 is a diagram illustrating a process in which 10 nodes transmit through a single joint channel and two data channels through competition.

An initial CW is set to 10, and all nodes simultaneously receive synchronization beacons and participate in competition.

The result of competition in a first round is 5 success slots, 2 failure slots, and 3 empty slots.

A node successful in competition selects a channel according to DTQ selection rules and enters a DTQ.

All of the remaining collision nodes participate in a next competition round, and reduce a window size by 1 according to an adaptive contention window algorithm.

In a second round, nodes n0, n1, and n9 that have entered a DTQ of each channel perform data transmission according to the FI-FO (First in, First Out) policy. At the same time, nodes that fail in competition again participate in competition, and the competition result is 3 success slots, 1 failure slot, and 5 empty slots. The remaining process is the iteration of a previous round.

In a third round, the remaining nodes n2 and n5 successfully compete, and all competition processes are ended.

The remaining nodes standing by in the DTQ detect that a CRI is ended through an FBP. Thereafter, the remaining nodes move to the DTQ of the joint channel based on the DTQ reassignment rule. According to the LI-FO (Last In, First Out) policy, the last entry nodes n2 and n5 move to the DTQ of the joint channel.

In an extra-round, nodes standing by in all DTQs including joint and data channels transmit data based on the FI-FO policy.

A method for resolving high-speed competition and distributing multi-channels in consideration of large-scale access based on LoRaWAN according to the present disclosure will be described in detail as follows.

Figure 8A:
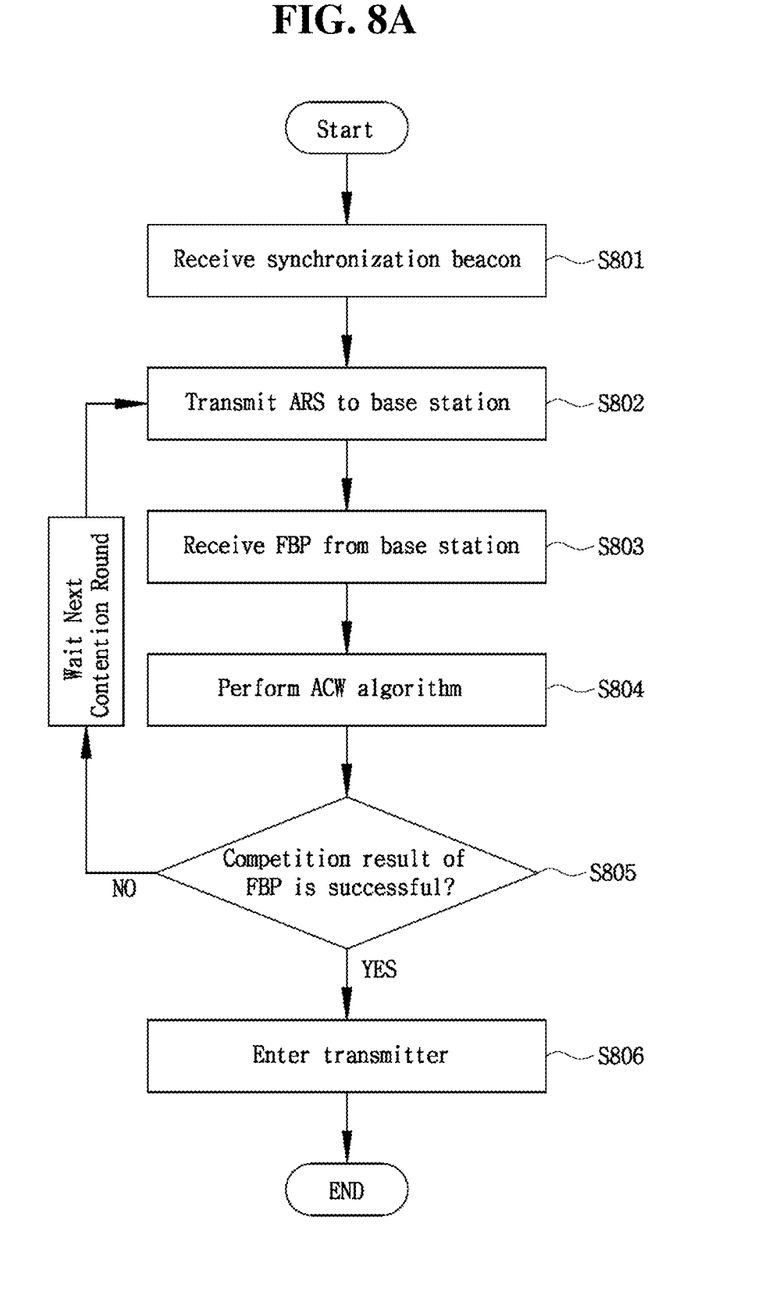
FIGS. 8A and 8B are flowcharts illustrating a method for resolving high-speed competition and distributing multi-channels in consideration of large-scale access based on a LoRaWAN according to the present disclosure.
Figure 8B:
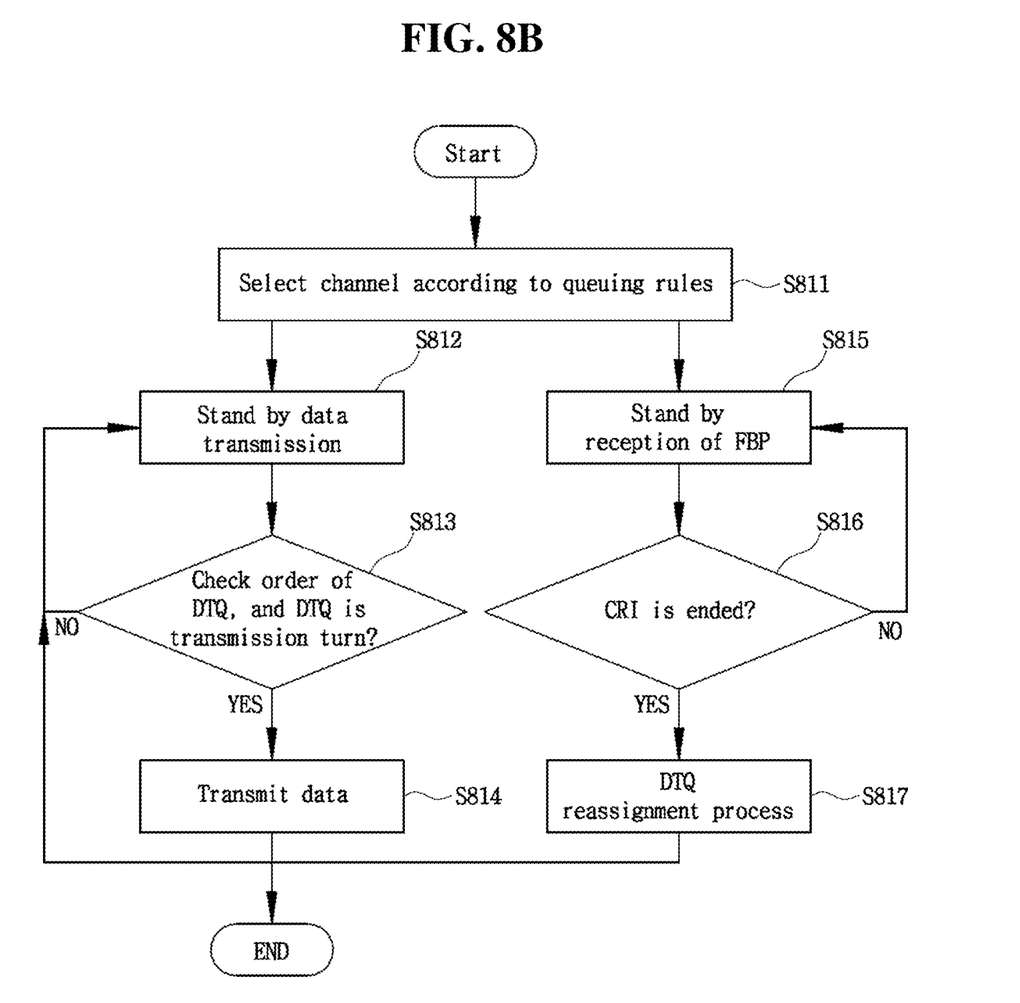

FIGS. 8A and 8B are flowcharts illustrating a method for resolving high-speed competition and distributing multi-channels in consideration of large-scale access based on LoRaWAN according to the present disclosure.

FIG. 8a illustrates an operation of a competition unit of a terminal node, and the competition unit receives a synchronization beacon (S801), and transmits an ARS to a base station (S802).

Thereafter, the competition unit receives an FBP from the base station (S803).

The competition unit performs an ACW algorithm (S804), determines whether the competition result of the FBP is successful (S805) and if the competition result of the FBP is successful, the terminal node enters the transmitter (S806).

If the competition result of the FBP is not successful, the competition unit participates in a next competition round.

FIG. 8B illustrates an operation of a transmitter of the terminal node, and the transmitter selects a channel according to queuing rules (S811).

Thereafter, the transmitter stands by data transmission (S812) and checks the order of data transmission queue (DTQ) (S813), and if the DTQ is the transmission turn, the transmitter transmits data (S814).

The transmitter selects a channel according to queuing rules, stands by reception of a feedback packet (FBP) (S815), determines whether a CRI is ended (S816), and performs a DTQ reassignment process (S817).

The above-described device and method for resolving high-speed competition and distributing multi-channels in consideration of large-scale access based on LoRaWAN according to the present disclosure can provide a random access-based medium access control protocol that enables efficient and stable communication through limited channel resources in a large-scale wireless transmission environment and minimize load balancing and wireless transmission overhead in a multi-channel wireless network environment to enable transmission.

As described above, it will be understood that the present disclosure is implemented in a modified form without departing from the essential characteristics of the present disclosure.

Therefore, the specified embodiments should be considered from a descriptive point of view rather than a limiting point of view, and the scope of the present disclosure is shown in the claims rather than the above description, and it should be interpreted that all differences within the scope equivalent thereto are included in the present disclosure.

Detailed Description of Main Elements

100: Terminal node competition unit
200: Terminal node transmitter

What is claimed is:

1. A device for resolving high-speed competition and distributing multi-channels in consideration of large-scale access based on LoRaWAN, the device comprising:
a terminal node competition unit for receiving a synchronization beacon and transmitting an access request signal (ARS) to a base station, and performing an aptive contention window (ACW) algorithm and enabling a terminal node to enter a transmitter according to a feedback packet (FBP) competition result when the FBP is received from the base station; and
a terminal node transmitter for selecting a channel according to queuing rules and checking data transmission queue (DTQ) order, transmitting data when the DTQ order is a transmission turn, standing by FBP reception, and determining whether a contention resolution interval (CRI) is ended to perform a DTQ reassignment process, wherein
queuing rules for nodes successful in competition to select a data channel comprise:
DTQ Selection Rules (during CRI) for enabling a node successful in competition to enter a shortest DTQ of the data channel when there is any failure slot; and
DTQ Reallocation Rules (after CRI) in which a node moves to a DTQ of a joint channel until all lengths of the DTQ are same according to a LI-FO (Last in, First out) policy when there is a slot without failure, and the terminal node competition unit is implemented via at least one processor.

2. The device of claim 1, wherein the terminal node competition unit comprises:
a sync beacon receiver for receiving a synchronization beacon;
an ARS transmitter for transmitting an ARS to the base station;
an FBP receiver for receiving an FBP from the base station;
an ACW algorithm execution unit for performing an ACW algorithm; and
a transmitter entry determination unit for checking the FBP competition result and enabling a terminal node to enter a transmitter, if the FBP competition result is successful, checking the FBP competition result, and enabling a terminal node to participate in a next competition round, if the FBP competition result is unsuccessful,
wherein the ACW algorithm execution unit and the transmitter entry determination unit are each implemented via at least one processor.

3. The device of claim 1, wherein the terminal node transmitter comprises:
a channel selection unit for selecting a channel according to queuing rules;
a DTQ order check unit for checking DTQ order in a data transmission standby state;
a data transmitter for checking the DTQ order and transmitting data when the DTQ order is the transmission turn;
an FBP reception standby unit for standing by FBP reception when a channel is selected according to queuing rules;
a CRI determination unit for determining whether the CRI is ended; and
a DTQ redistribution unit for performing a DTQ reassignment process, if the CRI is ended,
wherein the channel selection unit, the DTQ order check unit, the FBP reception standby unit, the CRI determination unit, and the DTQ redistribution unit are each implemented via at least one processor.

4. The device of claim 1, wherein a selected channel model is divided into the joint channel and a data channel, and
the joint channel is used only for competition during the CRI, and switches a role thereof to the data channel after the CRI, and the data channel is used only for transmitting data.

5. The device of claim 4, wherein all nodes start competition in the joint channel, and perform transmission through multiple data channels in an order of nodes in which collision is resolved, and
a performance of a joint channel model in which a control part and a data part are separated is not affected by a payload size.

6. The device of claim 1, wherein the ACW algorithm adaptively increases or decreases a size of a CW according to a result of each competition round, and
a $CW_{new}$, which is a CW of a next round, is determined by a number F of total failed slots and a number E of empty slots in each slot, and is calculated as $$CW_{new} = CW_{old} + F(CW_{old}) - E(CW_{old}).$$

7. The device of claim 6, wherein the ACW algorithm uses a merged-tree structure so as to prevent a competition node from being divided into multiple descendant nodes, and in a merged-tree, conflicting nodes should participate in a next competition round, and
the tree structure generates descendant nodes in a method of merging all sub-nodes.

8. The device of claim 7, wherein in the merged-tree structure,
even if the CW size increases adaptively, a size of a leaf node does not drop rapidly, and the leaf node and a window size decrease at a same rate.

9. The device of claim 1, wherein types of the DTQ rule are divided based on the end of the CRI,
during the CRI, the joint channel is in a busy state because competition is in progress, and when the CRI is ended, a role of the joint channel is switched to the data channel through DTQ redistribution, and
each node independently maintains a DTQ for each channel.

10. The device of claim 9, wherein during the CRI, a node whose conflict is resolved enters a shortest DTQ in mini-slot order, and
the end of the CRI may be detected when states of a mini-slot are all "empty".

11. The device of claim 10, wherein during the CRI, because competition occurs in a common channel, only a DTQ of the data channel may be selected, and
after the CRI, a DTQ reassignment process is performed to use a CDC channel as a data channel.

12. A method for resolving high-speed competition and distributing multi-channels in consideration of large-scale access based on LoRaWAN, the method comprising:
receiving a synchronization beacon, transmitting an access request signal (ARS) to a base station, and enabling a terminal node to enter a transmitter according to a feedback packet (FBP) competition result by performing an aptive contention window (ACW) algorithm when an FBP is received from the base station; and
selecting a channel according to queuing rules, checking data transmission queue (DTQ) order, transmitting data when the DTQ order is a transmission turn, standing by FBP reception, determining whether a contention resolution interval (CRI) is ended, and performing a DTQ reassignment process,
wherein queuing rules for nodes successful in competition to select a data channel comprise:
DTQ Selection Rules (during CRI) for enabling a node successful in competition to enter a shortest DTQ of the data channel when there is any failure slot; and
DTQ Reallocation Rules (after CRI) in which a node moves to a DTQ of a joint channel until all lengths of the DTQ are same according to a LI-FO (Last in, First out) policy when there is a slot without failure.

13. The method of claim 12, wherein when an initial contention window (CW) is set, all nodes simultaneously receive synchronization beacons to participate in competition, and
a node successful in first round competition selects a channel according to DTQ selection rules and enters a DTQ, and a node that enters a DTQ of each channel in a second round transmits data according to a FI-FO (First in, First Out) policy, and nodes that fail in competition again participate in competition.

14. The method of claim 13, wherein remaining nodes standing by in the DTQ detect that the CRI has ended through the FBP, and the remaining nodes move to a DTQ of a joint channel based on DTQ reassignment rules, and move to a DTQ of a last entered joint channel according to a LI-FO (Last In, First Out) policy.

15. The method of claim 14, wherein all remaining collision nodes that fail in competition participate in a next competition round and reduce a window size by 1 according to an ACW algorithm.

* * * * *